UNITED STATES PATENT OFFICE.

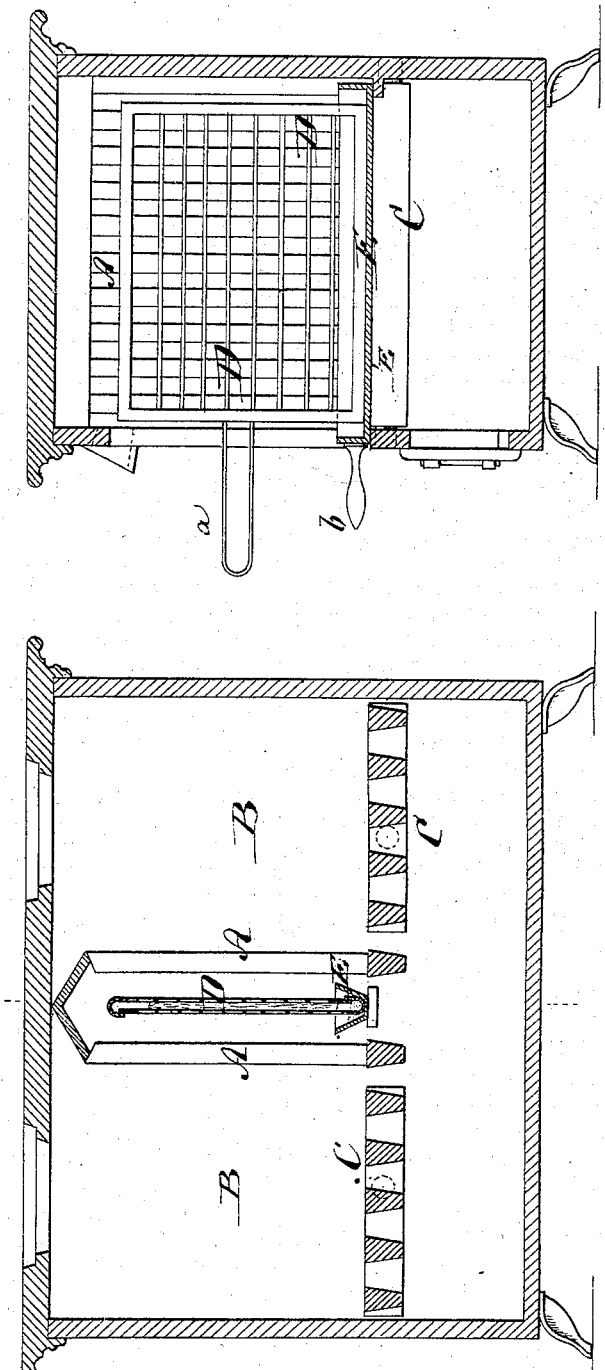

JACOB S. YORK, OF BROOKLYN, NEW YORK, ASSIGNOR TO HIMSELF AND JAMES H. SERENE, OF SAME PLACE.

IMPROVEMENT IN BROILER ATTACHMENTS FOR STOVES AND RANGES.

Specification forming part of Letters Patent No. 137,278, dated March 25, 1873.

*To all whom it may concern:*

Be it known that I, JACOB S. YORK, of Brooklyn, in the county of Kings and State of New York, have invented an Improved Broiling-Attachment to Stoves and Ranges, of which the following is a specification:

Figure 1 is a vertical transverse section through the fire-box of a stove, which is provided with my improved broiling attachment. Fig. 2 is a vertical longitudinal section of the same.

Similar letters of reference indicate corresponding parts in both figures.

This invention has for its object to provide stoves and ranges of all kinds with means for conveniently broiling meat and other substances, making toast, &c., and for completely collecting the juices from such meats, and also to permit the simultaneous application of heat to both sides of the substance to be broiled or toasted, so as thereby to economize fully one half the time usually expended in toasting or broiling. My invention consists, chiefly in the arrangement, within a stove or range, of a vertical attachment to the ordinary grate, or in fact of a vertical grate which serves on one side to receive the fire, and at the other side the broiler, and which will allow the heat from the fire to reach the broiler and effectually to act upon the matter held by the same. My invention also consists in providing stoves with two such vertical grates between two banks of fire, so that between them the broiler may be interposed vertically to allow the process to be carried on at both sides at once. The invention furthermore consists in the arrangement of a narrow dripping-pan, which is placed in the narrow vertical space outside of the single vertical grate or between the two vertical grates to receive the juice from the broiler.

In the accompanying drawing I have represented a stove with two vertical grates, A A, which are placed transversely within the fire-chamber B, dividing the same into two parts, so that there will be two horizontal grates, C C, as shown in Fig. 1. The vertical grates may be composed of grate-bars, as indicated, or made of perforated plates, or otherwise perforated, so as to allow the heat of the fire on the grate C to strike through into the space between the vertical grates A A. The broiler D for holding the matter to be broiled or toasted is in vertical or slightly inclined position inserted through an opening in the face of the stove between the two vertical grates, in manner clearly shown, suitable doors being provided at such opening for closing the same when the broiling process is not to be carried on. A trough or narrow pan, E, can, through the same opening, also be placed between the two vertical grates under the broiler, as shown, for receiving the drippings therefrom. Suitable supports should be arranged for holding the pan E in position, as indicated in Fig. 2. The handles *a b* of the broiler D and pan E, respectively, project outward through the opening of the stove, as in Fig. 2, to facilitate the handling of these instruments.

It will be readily seen that by means of this vertical grate arrangement I am enabled to broil meats, &c., much more rapidly than by the ordinary horizontal process, especially where two vertical grates are supplied, as shown, for the application of heat will take place from both sides at once; but even where on account of a narrow chamber I should use but one vertical grate, A, near the side of such fire-chamber to allow the interposition of the broiler between such single grate A and the side of the stove, the process will be more satisfactory and rapid than ordinarily, because the side of the broiler not turned to the fire will at least not be turned toward the cold air, which is the case during the ordinary horizontal process of broiling. Moreover the vertical position of the broiler, in connection with the narrow pan E, permits the complete saving of all the juices which at present are generally lost in and absorbed by the fire. In every other respect the stove is of the ordinary or suitable construction, provided with pastry-ovens or other attachments to suit convenience.

Claims.

1. The vertical grate or perforated partition A arranged in the fire-space of a stove or range for producing a vertical broiling-chamber, as set forth.

2. The combination with each other of two vertical grates or perforated partitions, A, within the same fire-chamber of a stove or range to allow broiling between two fires, as set forth.

3. A stove or range provided with a vertical broiling-chamber, as specified.

4. The narrow trough or pan E arranged in combination with the broiler D for use in a narrow vertical broiling-chamber, as specified.

JACOB S. YORK.

Witnesses:
A. V. BRIESEN,
MICHAEL RYAN.